(12) United States Patent
Markevitch et al.

(10) Patent No.: US 7,573,911 B2
(45) Date of Patent: *Aug. 11, 2009

(54) METHOD OF ENCODING A DATA PACKET

(75) Inventors: James A. Markevitch, Palo Alto, CA (US); Necdet Uzun, San Jose, CA (US); Earl T. Cohen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 11/242,441

(22) Filed: Oct. 3, 2005

(65) Prior Publication Data

US 2006/0062254 A1    Mar. 23, 2006

Related U.S. Application Data

(63) Continuation of application No. 09/853,834, filed on May 10, 2001, now Pat. No. 6,980,567.

(51) Int. Cl.
*H04L 12/28* (2006.01)
*H04J 3/03* (2006.01)
*G06F 15/173* (2006.01)

(52) U.S. Cl. .................. 370/474; 370/389; 370/462; 709/242

(58) Field of Classification Search ......... 370/231–252, 370/389–476; 709/242–245; 714/748–752
See application file for complete search history.

(56) References Cited

U.S. PATENT DOCUMENTS

| | | | | |
|---|---|---|---|---|
| 5,115,429 A | * | 5/1992 | Hluchyj et al. | 370/231 |
| 5,784,387 A | * | 7/1998 | Widmer | 714/752 |
| 6,169,738 B1 | * | 1/2001 | Sriram et al. | 370/395.21 |
| 6,344,807 B1 | * | 2/2002 | Hassner et al. | 341/59 |
| 6,356,561 B1 | | 3/2002 | Lau et al. | 370/462 |
| 6,609,223 B1 | * | 8/2003 | Wolfgang | 714/752 |
| 6,618,382 B1 | * | 9/2003 | Divivier et al. | 370/395.5 |
| 6,671,284 B1 | | 12/2003 | Yonge et al. | 370/462 |
| 6,697,432 B2 | * | 2/2004 | Yanagihara et al. | 375/240.26 |
| 6,704,310 B1 | * | 3/2004 | Zimmermann et al. | 370/389 |
| 6,718,491 B1 | * | 4/2004 | Walker et al. | 714/701 |
| 2003/0072329 A1 | * | 4/2003 | Janoska et al. | 370/476 |
| 2003/0133448 A1 | * | 7/2003 | Frink et al. | 370/389 |

* cited by examiner

*Primary Examiner*—M. Phan
(74) *Attorney, Agent, or Firm*—Campbell Stephenson LLP

(57) ABSTRACT

The invention provides a method of encoding a data packet for encapsulation in one or more frames for communication from a transmitter to a receiver in a network interface. The method includes dividing the data packet into one or more data chunks and determining the length of a data chunk as the lesser of the number of bytes available in a current frame, the number of bytes remaining in the data packet, or a predetermined number of bytes. The method includes determining if the data chunk is the end-of-the-packet (EOP) and when the data chunk is not the EOP, the method includes prepending the data chunk with a control character representing the length of the data chunk and non-EOP.

20 Claims, 4 Drawing Sheets

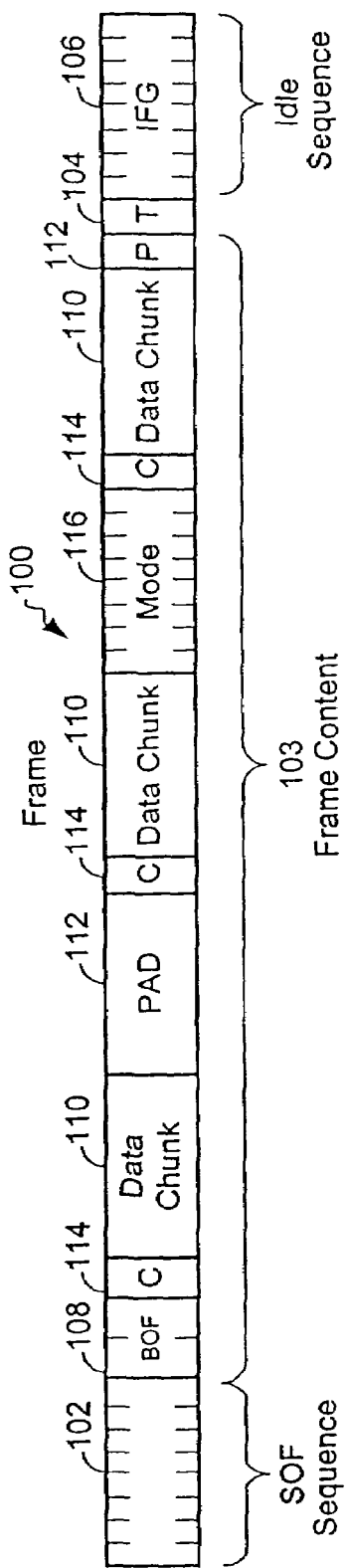
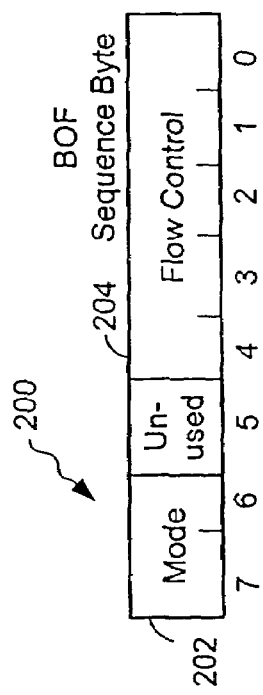
Fig. 2
Fig. 3

METHOD OF ENCODING A DATA PACKET

This application is a continuation of U.S. patent application Ser. No. 09/853,834, entitled "Method of Encoding A Data Packet," filed May 10, 2001, and naming James A. Markevitch, Necdet Uzun, and Earl T. Cohen as inventors, issued as U.S. Pat. No. 6,980,567. The above-referenced application is hereby incorporated herein by reference in its entirety.

The present invention relates generally to packet-switched communication networks.

BACKGROUND

In a packet-switched communication network, networking protocols are used to break traffic into packets of a variable size. Several pieces of information (per-packet overhead information) generally are maintained with each packet, for example, packet length, byte offset, and packet error status.

In addition, the networking devices through which the packets flow may transfer additional information (i.e., system-level overhead) with a packet. For example, when a packet is transferred over a particular link, error detection information to determine if the link is reliable, and flow control information for traffic management over the link, may be required to be transferred as well.

When sizing an external communication link in a networking device to provide packets at a certain bandwidth, additional bandwidth for the overhead (i.e., both the per-packet and the system-level overhead) may be required.

What is desirable is a low-overhead protocol for the communication of packets within networking devices that can reduce the bandwidth needed, and thus support sustained high traffic rates.

SUMMARY

In one aspect the invention provides a method of encoding a data packet for encapsulation in one or more frames for communication from a transmitter to a receiver in a network interface. The method includes dividing the data packet into one or more data chunks and determining the length of a data chunk as the lesser of the number of bytes available in a current frame, the number of bytes remaining in the data packet, or a predetermined number of bytes. The method includes determining if the data chunk is the end-of-the-packet (EOP) and when the data chunk is not the EOP, the method includes prepending the data chunk with a control character representing the length of the data chunk and non-EOP.

Aspects of the invention can include one or more of the following features. The method can include determining when the data chunk is the EOP, determining if there is an error in communication of the plurality of data chunks and, when there is not an error in communication of the plurality of data chunks, prepending the data chunk with a control character representing the length of the data chunk and EOP. When there is an error in communication of the plurality of data chunks, the method can include prepending the data chunk with a control character representing the length of the data chunk, EOP, and error in communication (ERR).

The method can include determining the number of bytes remaining in the current frame and, when the number of bytes remaining in the current frame is equal to one, inserting a pad character to the current frame. When the number of bytes remaining in the current frame is not equal to one, the method can include inserting a data chunk into the current frame. The method can include determining if there is a gap in the data packet and when there is a gap in the data packet, inserting one or more characters represent pad in the current frame. The method can include determining if there is a mode change in the communication of the one or more frames and, when there is a mode change, determining if the number of bytes remaining in the current frame is less than a second predetermined number. When the number of bytes remaining in the current frame is not less than the second predetermined number, the method can include inserting a control character representing the mode change in the current frame.

The method can include checking upon a mode change if the frame should be truncated, and if so. truncating the frame so the mode change information is immediately transmitted to the receiver. The method can include truncating the frame while maintaining alignment in the network interface. The method can include prepending the frame with a control byte representing the beginning-of-frame (BOF). The control byte representing BOF can indicate mode of transmission and depth information for a complementary receiver on a same side of the network interface. The method can include prepending another control byte representing the BOF that is identical to the first control byte.

Aspects of the invention can include one or more of the following advantages. In one aspect, the invention allows for the encoding of the full 9.58 Gbps date rate of an OC-192 SONET connection into a data stream for transmission over a 10 Gbit Ethernet (10 GE) connection where the average packet size is approximately 37 bytes or larger. The encoding methodology provided allows for all overhead (e.g., for framing, packet error reporting, error detection, and sideband communication) to fit within the 4% difference between these two bandwidths.

Using the encoding techniques described herein for encoding a full SONET data rate in a standard 10 GE connection provides an inexpensive way for networking devices with external SONET interfaces to use standard inexpensive communication media (e.g., 10 GE connections) for inter-chip internal links. The inventive encoding techniques support the full SONET data rate while still providing the required additional bandwidth for the per-packet and system-level overhead. These and other advantages will be apparent to those skilled in the art from a reading of detailed description below and study of the accompanying figures.

DESCRIPTION OF DRAWINGS

FIG. 2 is a diagram of a format for a frame.
FIG. 3 is a diagram of a format for a beginning-of-frame sequence byte.

DETAILED DESCRIPTION

The 10 Gbit Ethernet (10 GE) standard is becoming better defined, including an interface referred to as XGMII. The protocol used in the proposed 10 GE standard is detailed in IEEE Draft P802.3ae/D2.0, which is hereby incorporated by reference.

The present invention provides a protocol for encoding packet data into a format with low overhead and means for implementing the protocol. The protocol can be implemented in a transmitter/receiver pair coupled by a network communication interface. At a transmitter side of the network communication interface, packet data (i.e., a data stream) is initially received on a first interface, such as on a SONET OC-192 connection. The received data stream is encoded into formatted frames in accordance with a low overhead output protocol described herein. The formatted data frames include packet data for one or more packets, overhead including per-packet and system-level overhead information and other information (such as mode information as will be described in greater detail below). The formatted frames are transferred from the transmitter to a receiver through the network communication interface over a medium. The network communication interface between the transmitter and the receiver is controlled by a transmission protocol. In one implementation, the transmission protocol is a 10 GE protocol (i.e., the formatted frames encoded by the transmitter are transferred on a 10 GE channel).

A receiver at an end of the transmission medium receives the formatted frames. The receiver can decode the formatted frames to recover the original packet data. In addition, the receiver can recover and operate on overhead and other information included in each formatted frame. The other information can be used for flow control, or other system level functions. The receiver side of the interface can in turn, forward the recovered packet data, reconstruct the data stream or otherwise manipulate the packet data as appropriate.

A number of terms are used herein to describe network transmissions and related structures and processes. "Character" refers to a full 9-bit character transmitted/received on the XGMII interface.

Figure 1:
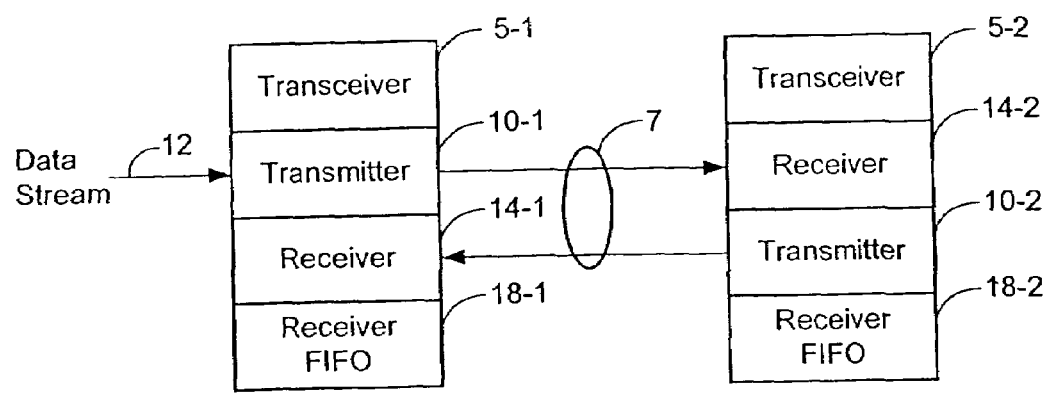
FIG. 1 is a diagram of a simplified network.

FIG. 1 is a diagram of a simplified network interface controlled by the protocol set forth herein. The network interface includes a transceiver 5 on each side of the interface coupled by a bi-directional communication link 7. Each transceiver 5 includes a transmitter 10 and receiver 14. A transmitter 10 on one side of the network interface (the "transmit" side of the network interface) processes a data stream in accordance with the encoding technique described below. The data stream includes one or more data packets 12. Processed data is communicated to a receiver 14 in a second side of the network interface (i.e., the "receive" side of the network interface) over the communication link 7. The receiver 14 may include a first-in-first-out (FIFO) memory device 18 for storing the received processed data.

FIG. 2 shows one implementation for a format of a frame passed between transmitter 10 and receiver 14 in accordance with a transmit protocol for the simplified network shown in FIG. 1. The transmit protocol specifies the format for frames of data passed over communication link 7 and consists of frames 100 with the following structure:

Start-of-frame (SOF) sequence 102 (8 bytes in one implementation);

Frame content 103 (1515 bytes in one implementation);

Terminate character /T/ 104 (1 byte in one implementation);

Interframe gap (IFG) idle sequence 106 (12 bytes in one implementation).

Thus, the total length of the frame contents plus framing overhead is 1536 bytes in one implementation. Other frames lengths, including jumbo frames can be specified as described in greater detail below.

The frame 100 may be prepended with the SOF sequence 102. The SOF sequence 102 may include an 8-byte start sequence including an /S/ character, followed by six bytes of preamble characters PRE, and concluded with a start-frame-delimiter (SFD) character. The /S/ character may be passed in lane 0 of the XGMII interface.

The frame 100 may be appended with a terminate character /T/ 104. The /T/ 104 may be passed in any lane of the XGMII interface.

The frame 100 may also be appended with an IFG idle sequence 106 that may include 12 bytes of idle control characters /I/.

The framing-related characters may have the following values for an XGMII interface: /S/, Control 0xFB; PRE, 0x55; SFD, 0xD5: /T/, Control 0xFD; and /I/, Control 0x07.

The frame 100 may also be prepended with a beginning-of-frame (BOF) sequence 108 following the SOF sequence 102. The frame content 103 may begin with two bytes of BOF characters 108. The remainder of the frame content 103 may include data chunks 110, pad characters 112, and control information 114.

The BOF sequence 102 may include two bytes of characters that may be identical. Repetition of characters reduces the likelihood that an undetected error in one byte will cause incorrect information to be interpreted by the receive side of the interface. The two bytes may be sent in different lanes of the XGMII interface, so that corruption within a single lane will not result in both bytes being corrupted.

FIG. 3 is a diagram showing a format of a BOF sequence byte 108 in accordance with one implementation of the invention. Each of the BOF sequence bytes 108 may include 2 bits 202 that represent the current mode of operation, for example, normal, pass-through, wrap, and reset. In addition, each BOF control byte 108 may include 5 bits 204 that represent flow control information, for example, the current space available in a receive first-in-first-out (FIFO) storage device (e.g., FIFO memory element 18 of FIG. 1).

In one implementation, the encoding of each of the BOF sequence bytes 108 is as follows:

| | | |
|---|---|---|
| Bits 7-6: | Mode | |
| | 00 | Normal; |
| | 01 | Pass-Through: |
| | 10 | Wrap; |
| | 11 | Reset. |
| Bit 5: | Reserved. | |
| Bits 4-0: | FIFO space available | |
| | 0 | No space available; |
| | 1-30 | At least n/32 of the receive space available, where n = 1-30; |
| | 31 | At least 31/32 of the receive space available. |

When the receive side of the interface (e.g., receiver 14 of FIG. 1) receives BOF sequence bytes 108 that have the same value, the receiver 14 may accept the information contained in the BOF sequence bytes and respond appropriately. When the receive side of the interface receives sequence bytes 108 that have different values, the receiver 14 may reject the BOF sequence byte information, treating the data as corrupted.

The depth information represents the fraction of receive FIFO space available at one side of the interface (e.g., FIFO memory element 18-1 or 18-2 in FIG. 1). As described above, the interface includes two transceivers 5, one on each side of the interface. A transmitter (e.g., transmitter 10-1) on one side of the interface communicates with the receiver (e.g., receiver 14-1) in the same side of the interface and provides an estimate of the capacity of the receiver's FIFO (e.g., FIFO 18-1). In one implementation, the estimate of the capacity of the receiver's FIFO (e.g., FIFO 18-1) is represented with a series of flow control bits 204. In one implementation, flow control bits 204 have a value between 0 and 31, indicating that FIFO has anywhere from no space available to less than 31/32 of the FIFO's space is currently available. The estimate is transmitted from a transmitter (e.g., transmitter 10-1) on one side of the interface to a receiver (e.g., receiver 14-2) on the other side of the interface. The receiver (e.g., receiver 14-2) communicates the estimate data to its local transmitter (the transmitter on the same side of the interface as the receiver that received the estimate, e.g., transmitter 10-2). The estimate data can be used by the transmitter (e.g., transmitter 10-2) on a respective side of the interface to apply flow control techniques as appropriate to limit the data transferred through the interface in a given direction. This type of backpressure information flow (i.e., flow control bits flowing in a direction opposite to the direction that its associated data travels) allows the interface to self regulate to prevent FIFO overflow. The control bits can be decoded to determine the estimated space available in a receiver's FIFO. The decoding can include subtracting a small constant from the estimated depth information to accommodate for the delay incurred when transmitting the estimate data across the interface. The estimated depth information can be stored in a counter. A transmitter can check the counter and regulate data transmission through the interface as appropriate (e.g., if the counter reaches 0, the transmitter may stop sending new chunks of data).

The data packet may be divided into data chunks 110. The data chunks may be prepended with a control character 114 representing the length of the data chunk 110, end-of-packet (EOP), and error information (ERR) for the data packet.

Protection mechanisms present in the receiver may detect errors.

Frame 100 or data chunk 110 may include a single non-data byte of the form of a pad character 112 or a control character 114. The characters representing the pad and control length information may have the following values:

| | |
|---|---|
| 0: | PAD (intra-packet); |
| 1-80: | Non-EOP data chunk; |
| 81-160: | EOP data chunk; |
| 161-240: | EOP with ERR data chunk; |
| 241-250: | Reserved; |
| 251: | Reset mode; |
| 252: | Wrap mode; |
| 253: | Pass Through mode; |
| 254: | Normal mode; |
| 255 | Pad (Inter-packet). |

When the transmitting side changes mode, for example, from normal to wrap, mode control characters may be inserted at the beginning of the frame 100 in the BOF sequence 102 or intra-frame, for example, between data chunks 110. The intra-frame mode control characters may be replicated eight times in eight mode bytes 116. The replication reduces the likelihood that corruption will induce a mode change in the receiver.

If there are insufficient bytes at the end of a frame 100 to insert the mode-change control characters, then mode-change control characters may not be inserted intra-frame. Instead, the BOF sequence bytes 108 in the next frame may indicate the mode change.

Alternatively, whenever a mode change occurs, the current frame 100 can be truncated, resulting in a frame content 103 that is less than a normal (e.g., 1515 byte) byte length. A next frame (i.e., the frame after the truncated frame) can communicate the mode change information (i.e., the new current mode) in the BOF sequence bytes 108 of the next frame.

A transmitting side of the interface may insert PAD characters 112 in the frame 100 for a variety of reasons. For example, a truncated frame may be padded with PAD characters to ensure that the frame length is never shorter than a minimum length so as to align the frame to a proper lane. In another example, PAD characters may need to be inserted to ensure that the interface does not go idle (and not send any data); when the remaining bytes of a frame 100 may have insufficient space to include the smallest chunk of data; and when the transmitting side cannot send more data due to flow-control information it has received. PAD characters 112 may be inserted between data chunks and have a distinct encoding to prevent them from being interpreted as the character at the start of a data chunk 110.

Figure 4A:
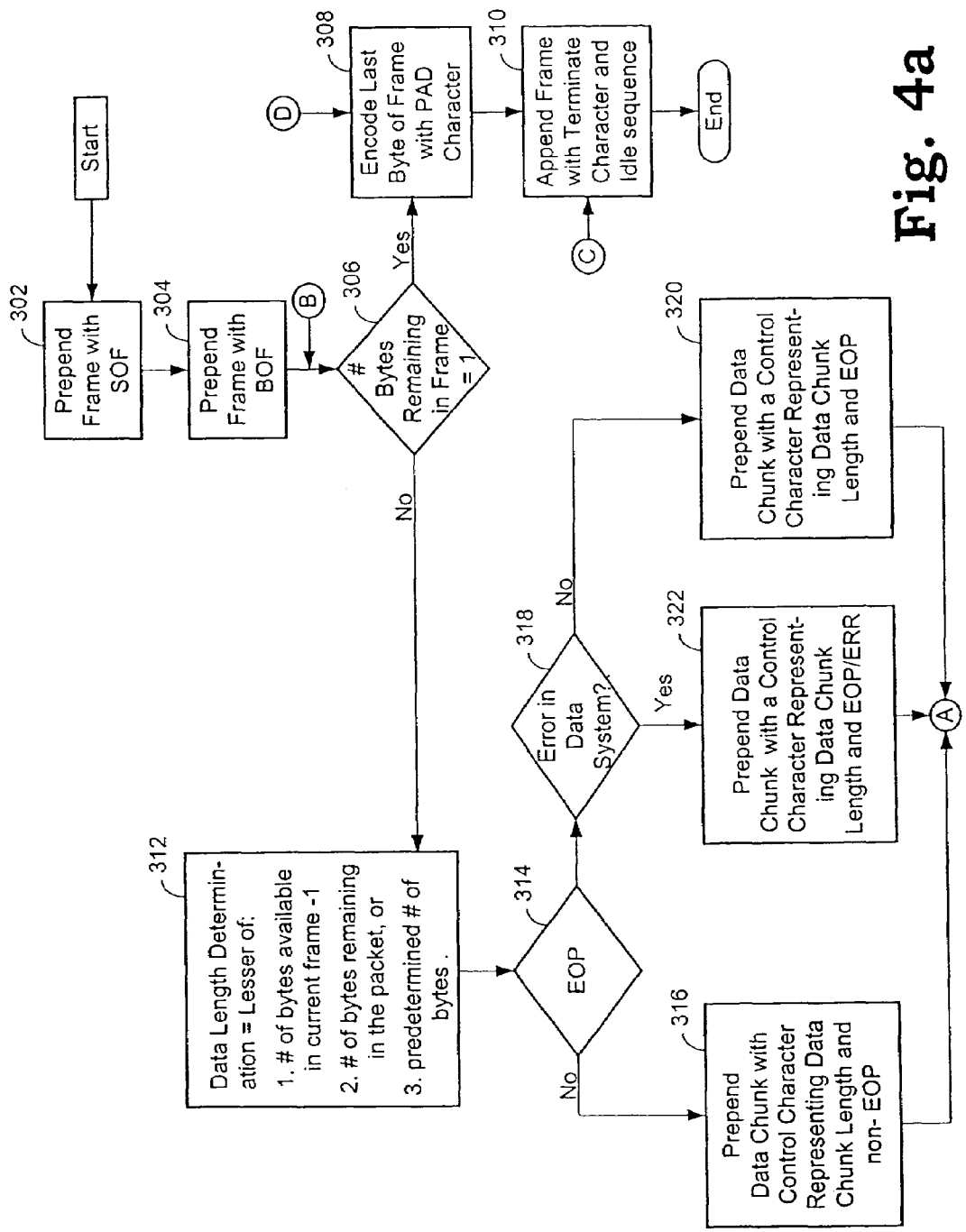
FIGS. 4a and 4b are a flow chart for encoding a data packet.
Figure 4B:
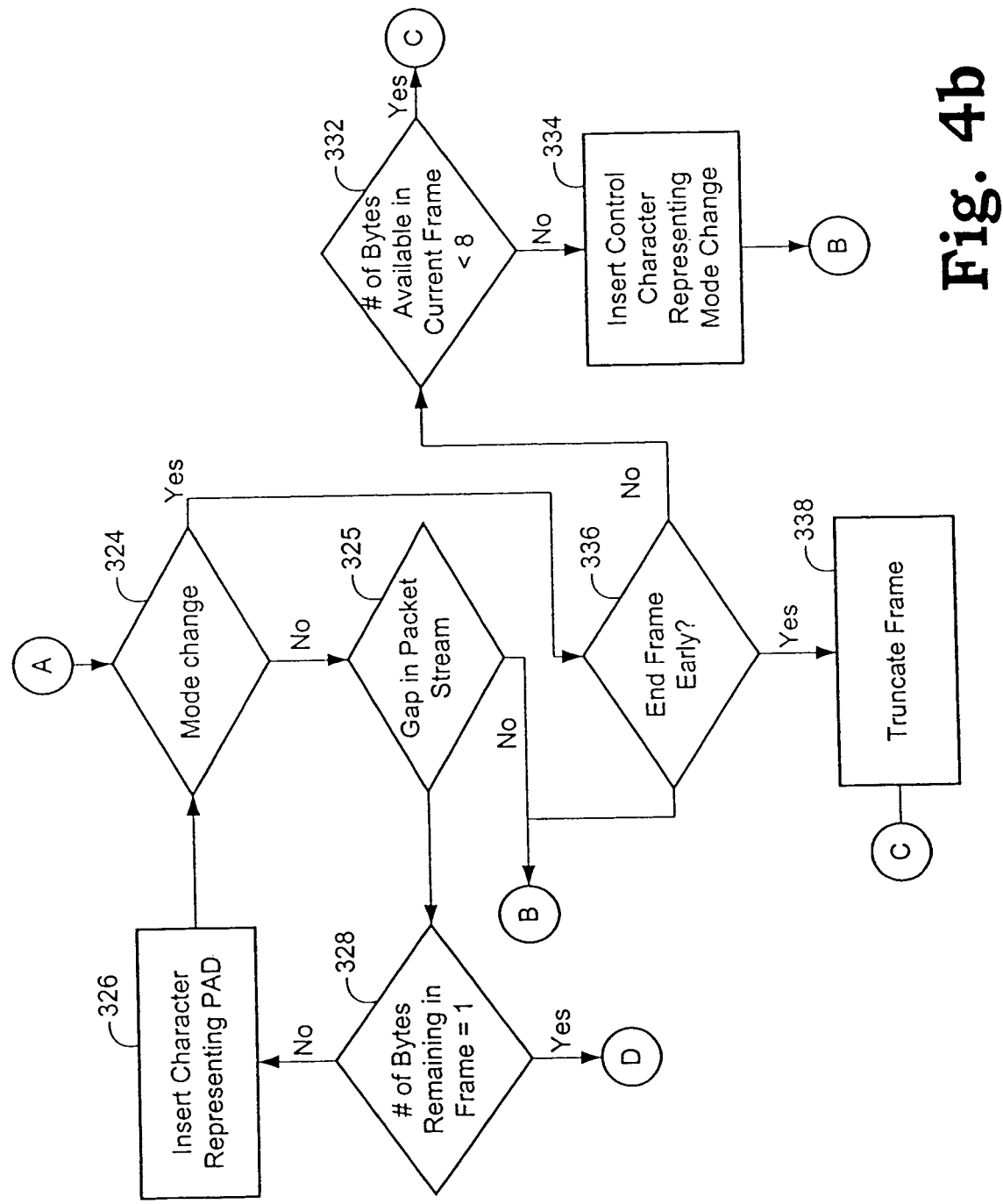

FIGS. 4a and 4b show a flow chart for encoding a data packet in accordance with a protocol with low overhead. The SOF sequence 102 is prepended to the frame 100 at 302. The frame is also prepended with BOF characters 108 at 304. The number of bytes remaining in the frame is determined at 306. When there are not enough bytes to encode a data chunk 110, for example, when the number of available bytes is equal to 1, then the remaining bytes are encoded with a pad character 112 at 308. The terminate character 104 and idle sequence 106 are then appended to the frame at 310. Thereafter the process ends.

When there are sufficient remaining bytes in the frame at 306, the data chunk 110 is encoded at 312. The length of the data chunk is determined to be the lesser of (1) the number of bytes available in the current frame minus one, (2) the number of bytes remaining in the data packet, (3) or a predetermined number of bytes, for example, 80, at 312.

The transmitter 10 then determines if the data chunk 110 includes the last bytes of the data packet at 314. When the data chunk 110 is not the last bytes in the data packet, the data chunk 110 is prepended with a control character 114 representing data chunk length and non-EOP at 316. Thereafter the process is continued at 324.

When the data chunk includes the last bytes of the data packet, the data stream is checked for errors at 318. When there is not an error, the data chunk 110 is prepended with a control character 114 representing data chunk length and EOP at 320. When there is an error, the data chunk 110 is prepended with a control character 114 representing data chunk length and EOP/ERR at 322. Thereafter the process continues at step 324 checking to see if there is a mode change.

At step 324, a check is made for a mode change in the communication of the one or more frames. When the mode does not change, a check is made at step 325 to determine if a gap exists in the data.

PAD characters 112 may be inserted for some of the reasons previously described. At 325, a determination is made as to whether pad characters 112 should be inserted. If there is a gap in the data, the number of bytes remaining in the current frame is determined at 328. If the remaining bytes do not equal 1, pad characters 112 are inserted in the current frame 100 at 326 until the remaining bytes equal 1 or until more packet data arrives or a mode change is detected. If the remaining bytes in the current frame 100 are determined to be, for example, 1, at 328, then a single pad character 112 may be inserted at 308 and the current frame terminated at 310. Thereafter a next frame can be formatted.

When there is a mode change (detected at step 324), a determination is made as to whether to truncate the frame or to send the mode change information in the normal course of operation. If the frame is to be truncated (336), the frame is truncated including appropriately padding the truncated frame with PAD characters to preserve alignment (e.g., (mod 32)) in the lanes of the interface (338). Thereafter, the frame is terminated at step 310. If the frame is not to be truncated, then a determination is made as to whether the number of bytes remaining in the current frame is less than a predetermined number, for example, 8, at 332. When the number of bytes remaining in the current frame is less than the predetermined number, the frame is terminated at 310. When the number of bytes remaining in the current frame is not less than the predetermined number, a sequence of control characters representing the mode change is inserted in the current frame at 334.

When a receiver sits idling (e.g., receiving pad characters because no data is available to be transmitted), the receiver may wait until the start of a new frame before processing data. The receiver may "synchronize" the interface after an idle period by discarding data chunks received up to and including the first chunk marked with an EOP. Other synchronization methods may be used as appropriate.

If a receiver discovers an error, for example, an illegal character, a state equivalent to reset may be entered by implementing the synchronization procedure. A partially received packet may be marked as an error.

With the benefit of this disclosure, those skilled in the art may recognize that other modifications and variations may be made in the line of the present invention and in operation of this method without departing from the scope or spirit of this invention. For example, the data chunk size may be other than 80 bytes. Jumbo frames of 8192 bytes with 32-byte idle sequences may be used. Other methods of encoding control bytes may be used. Bit stuffing techniques could be used to reduce overhead. For example, using 7-bit bytes or 9-bit bytes could have advantages in certain applications.

A number of embodiments of the invention have been described. Nevertheless, it may be understood that various modifications may be made without departing from the spirit and scope of the invention. Accordingly, other embodiments are within the scope of the following claims.

What is claimed is:

1. A method comprising:
    determining a data chunk length, wherein the data chunk length is based on the lesser of:
        a number of bytes available in a current frame, a number of bytes untransmitted bytes remaining in a data packet, and a predetermined number of bytes;
    forming at least a portion of the current frame using data from the data packet, wherein the at least the portion of the current frame has the determined data chunk length; and
    transmitting the current frame.

2. The method of claim 1 further comprising:
    determining the number of bytes remaining in the current frame.

3. The method of claim 2 further comprising at least one of:
    inserting a pad character into the current frame when the number of bytes remaining in the current frame is equal to one; and
    inserting the at least the portion of the current frame into the current frame when the number of bytes remaining in the current frame is not equal to one.

4. The method of claim 1 further comprising:
    determining whether the data from the data packet includes an end of the packet; and
    including an end of packet indicator in the current frame.

5. The method of claim 4 further comprising:
    including a control character representing the length of the packet in the current frame.

6. The method of claim 1 further comprising:
    determining whether an error in communication has occurred; and
    including an error indicator in the current frame when the error in communication has occurred.

7. The method of claim 1 further comprising:
    determining whether a frame communication mode change has occurred.

8. The method of claim 7 further comprising:
    truncating the current frame when a frame communication mode change has occurred.

9. The method of claim 7 further comprising:
    terminating the current frame when a frame communication mode change has occurred.

10. The method of claim 7 further comprising:
    inserting at least one control character into the current frame when a frame communication mode change has occurred.

11. An apparatus comprising:
    a receiver;
    a receiver FIFO; and
    a transmitter, wherein the transmitter is configured to:
        determine a data chunk length, wherein the data chunk length is based on the lesser of: a number of bytes available in a current frame, a number of bytes untransmitted bytes remaining in a data packet, and a predetermined number of bytes,
        form at least a portion of the current frame using data from the data packet, wherein the at least the portion of the current frame has the determined data chunk length, and
        transmit the current frame.

12. The apparatus of claim 11 wherein the transmitter is further configured to determine the number of bytes remaining in the current frame.

13. The apparatus of claim 11 wherein the transmitter is further configured to at least one of:
    insert a pad character into the current frame when the number of bytes remaining in the current frame is equal to one; and
    insert the at least the portion of the current frame into the current frame when the number of bytes remaining in the current frame is not equal to one.

14. The apparatus of claim 11 wherein the transmitter is further configured to:
    determine whether the data from the data packet includes an end of the packet; and
    insert an end of packet indicator in the current frame.

15. The apparatus of claim 11 wherein the receiver is further configured to detect an error in communication has occurred, and wherein the transmitter is further configured to insert an error indicator in the current frame when the error in communication has occurred.

16. The apparatus of claim 11 wherein at least one of the transmitter and the receiver are configured to determine whether a frame communication mode change has occurred.

17. The apparatus of claim 11 wherein the transmitter is further configured to truncate the current frame when a frame communication mode change has occurred.

18. The apparatus of claim 11 wherein the transmitter is further configured to terminate the current frame when a frame communication mode change has occurred.

19. The apparatus of claim 11 wherein the transmitter is further configured to insert at least one control character into the current frame when a frame communication mode change has occurred.

20. An apparatus comprising:

a means for determining a data chunk length, wherein the data chunk length is based on the lesser of: a number of bytes available in a current frame, a number of bytes untransmitted bytes remaining in a data packet, and a predetermined number of bytes;

a means forming at least a portion of the current frame using data from the data packet, wherein the at least the portion of the current frame has the determined data chunk length; and a means for transmitting the current frame.

* * * * *